United States Patent
Hiscock et al.

(10) Patent No.: US 9,264,240 B2
(45) Date of Patent: Feb. 16, 2016

(54) POWER SHARING WITH STACKABLE SWITCHES

(75) Inventors: James Hiscock, Rockport, MA (US); Hazem Kabbara, Boylston, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1171 days.

(21) Appl. No.: 13/156,869

(22) Filed: Jun. 9, 2011

(65) Prior Publication Data

US 2011/0234002 A1    Sep. 29, 2011

Related U.S. Application Data

(63) Continuation of application No. 12/371,763, filed on Feb. 16, 2009.

(51) Int. Cl.
| | |
|---|---|
| H02J 1/10 | (2006.01) |
| H02J 3/00 | (2006.01) |
| H02J 3/14 | (2006.01) |
| H02M 1/10 | (2006.01) |
| H04L 12/10 | (2006.01) |
| H02J 1/14 | (2006.01) |

(Continued)

(52) U.S. Cl.
CPC . *H04L 12/10* (2013.01); *H02J 1/14* (2013.01); *G06F 1/26* (2013.01); *G06F 11/30* (2013.01); *H02J 3/14* (2013.01); *Y02B 60/33* (2013.01); *Y10T 307/391* (2015.04); *Y10T 307/414* (2015.04)

(58) Field of Classification Search
CPC ............ G06F 1/26; G06F 11/30; H02J 3/14; H02J 9/061; H02J 1/10; Y02B 70/3225; Y04S 20/222
USPC ................ 307/29, 32; 713/340; 370/219, 220
See application file for complete search history.

(56) References Cited

U.S. PATENT DOCUMENTS

| | | |
|---|---|---|
| 7,155,622 B2 | 12/2006 | Mancey et al. |
| 7,176,589 B2 | 2/2007 | Rouquette |

(Continued)

FOREIGN PATENT DOCUMENTS

| | | |
|---|---|---|
| CN | 1477833 A | 2/2004 |
| CN | 1501593 A | 6/2004 |

(Continued)

OTHER PUBLICATIONS

Office Action, CN Application No. 201010114339.6, Date: Mar. 5, 2014, pp. 1-17.

(Continued)

*Primary Examiner* — Rexford Barnie
*Assistant Examiner* — Jagdeep Dhillon
(74) *Attorney, Agent, or Firm* — Trop, Pruner & Hu, P.C.

(57) ABSTRACT

A technique includes selecting a first device from a plurality of interconnected devices to form a root of a power tree connecting the interconnected devices and allocating power among neighbors of the interconnected devices in a direction along the tree away from the root. The technique includes determining whether at least one of the interconnected devices needs power after the allocation of power among the neighbors and selectively further allocating power among the neighbors in a direction along the tree toward the root based on the determination.

9 Claims, 18 Drawing Sheets

(51) Int. Cl.
*G06F 1/26* (2006.01)
*G06F 11/30* (2006.01)

(56) References Cited

U.S. PATENT DOCUMENTS

| | | |
|---|---|---|
| 7,254,001 B2 | 8/2007 | Papallo et al. |
| 7,607,043 B2 | 10/2009 | Crawford |
| 7,630,299 B2 * | 12/2009 | Magret et al. ............ 370/219 |
| 8,250,381 B2 * | 8/2012 | Hansalia et al. ............ 713/300 |
| 2006/0072460 A1 | 4/2006 | Fukui et al. |
| 2009/0217073 A1 * | 8/2009 | Brech et al. ............ 713/340 |
| 2010/0171602 A1 * | 7/2010 | Kabbara et al. ............ 340/333 |

FOREIGN PATENT DOCUMENTS

| | | |
|---|---|---|
| CN | 1639939 A | 7/2005 |
| CN | 1794636 A | 6/2006 |
| WO | WO-2007/058871 A1 | 5/2007 |

OTHER PUBLICATIONS

Office Action, CN Application No. 201010114339.6, Date: Aug. 15, 2013, pp. 1-16.

* cited by examiner

POWER SHARING WITH STACKABLE SWITCHES

CROSS REFERENCE TO RELATED APPLICATIONS

This application is a continuation of U.S. patent application Ser. No. 12/371,763, entitled, "Power Sharing With Stackable Switches," filed on Feb. 16, 2009, which is hereby incorporated by reference in its entirety and is related to the following U.S. patent application, which is hereby incorporated by reference in its entirety: U.S. patent application Ser. No. 12/348,697, filed on Jan. 5, 2009, entitled, "Intelligent Power Management of an Intermediate Network Device Switching Circuitry and PoE Delivery."

TECHNICAL FIELD OF THE INVENTION

In general, embodiments of the present invention are directed to techniques for providing power to switching circuits and to attached devices over Ethernet cables.

BACKGROUND

Power requirements for stackable switches are becoming more unpredictable. As a result, the old method of having a dedicated power supply for each stackable switch is becoming less cost effective and does not provide the reliability of power sharing and redundancy. Stackable switches have their own integral power supply that is designed to meet the needs of only that one device's switching circuitry and to provide power via its Power Over Ethernet (PoE) ports. Some variations, such as the DecHub 90 & 900, had snap-on power supplies that converted a hub module into a stackable module. Although stackable switches have the capability to connect into a Redundant Power Supply (RPS) via a dedicated RPS connector and cable, these solutions only provide power; they do not provide power-sharing from one switch to another. Furthermore, they use dedicated connectors to provide the power to the switch.

There is a catch-22 problem managing power allocation between switch port operation and PoE power delivery. If one were to first measure the power used by the switching circuitry to estimate the amount of power the circuitry will need, the estimate will be low because the circuitry is in an idle state and therefore not consuming as much power as when it is passing data in an active state. If one were then to allocate PoE power based on this low estimate and then turn on the external devices, the devices would begin to transmit data, thereby activating the switching circuitry, which would not receive sufficient power. On the other hand, if one first tries to allocate all the PoE power requested, insufficient power may be reserved for the switching circuitry. To avoid such problems, existing switches typically supply the maximum (worst-case) power to the switching circuitry and to PoE at all times.

What is needed, therefore, are improved techniques for providing power to network switches.

SUMMARY

In an implementation, a technique includes selecting a first device from a plurality of interconnected devices to form a root of a power tree connecting the interconnected devices and allocating power among neighbors of the interconnected devices in a direction along the tree away from the root. The technique includes determining whether at least one of the interconnected devices needs power after the allocation of power among the neighbors and selectively further allocating power among the neighbors in a direction along the tree toward the root based on the determination.

DETAILED DESCRIPTION

Embodiments of the present invention allocate power to a set of network-connected devices, including one or more network switches, using a protocol that treats the devices as one logical managed entity. Before explaining particular techniques for allocating power, however, examples will be provided of devices that may be used in conjunction with embodiments of the present invention.

Figure 1:
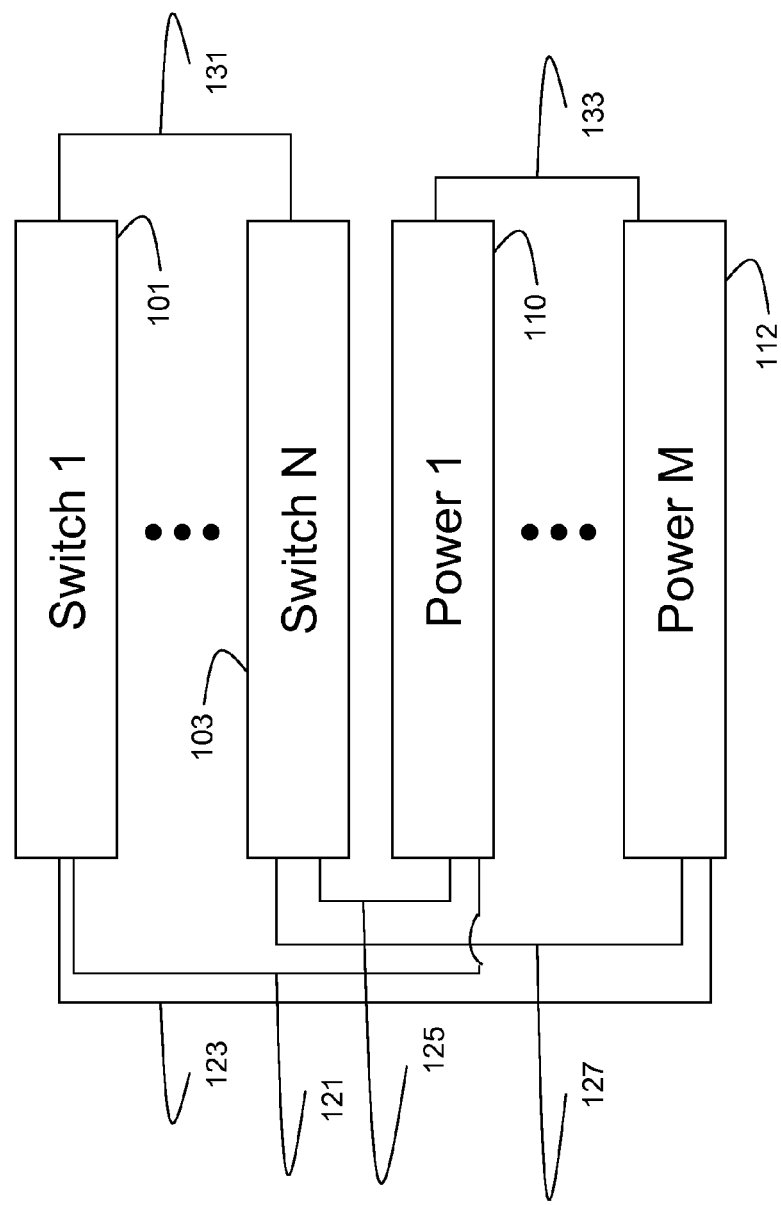
FIG. 1 illustrates a stackable system configuration according to one embodiment of the present invention.

Referring to FIG. 1, a highly redundant stackable switch configuration is shown where all the power supply stackable devices 110-112 are connected to all the switch stackable devices 101-103, and all the switches 101-103 are connected to all the other switches 101-103. Although only these particular switches, power supply devices, and power links are shown in FIG. 1 for ease of illustration, any other switches and power supply devices would similarly be connected by power links to all other switches and power supply devices in the embodiment of FIG. 1.

This fully redundant configuration becomes impractical at large numbers of power supplies and switches, but is very reasonable when there are only 2-4 switches and 2 or 3 power supplies. Other non-fully interconnected configurations are very reliable and more cost effective. Power is supplied from the power supply stackable devices and/or the switch modules via interconnecting cables.

For example, the Power1 stackable power supply device 110 is capable of supplying power to Switch1 101 via cable 121 and to SwitchN 103 via cable 125. Likewise the PowerM stackable device 112 is capable of supplying power to Switch1 101 via cable 123 and to SwitchN 103 via cable 127. Power can also be supplied from one power stackable device to another as shown in the cable 133 between Power1 110 and PowerM 112. Also, power can be supplied from one switch to another as shown in the cable 131 between Switch1 101 and SwitchN 103. Although the cables shown could be dedicated power cables, they also could, for example, be Ethernet cables that utilize 802.3af or 802.3at power delivery technology capable of supplying up to 59 watts per Ethernet cable.

Figure 2:
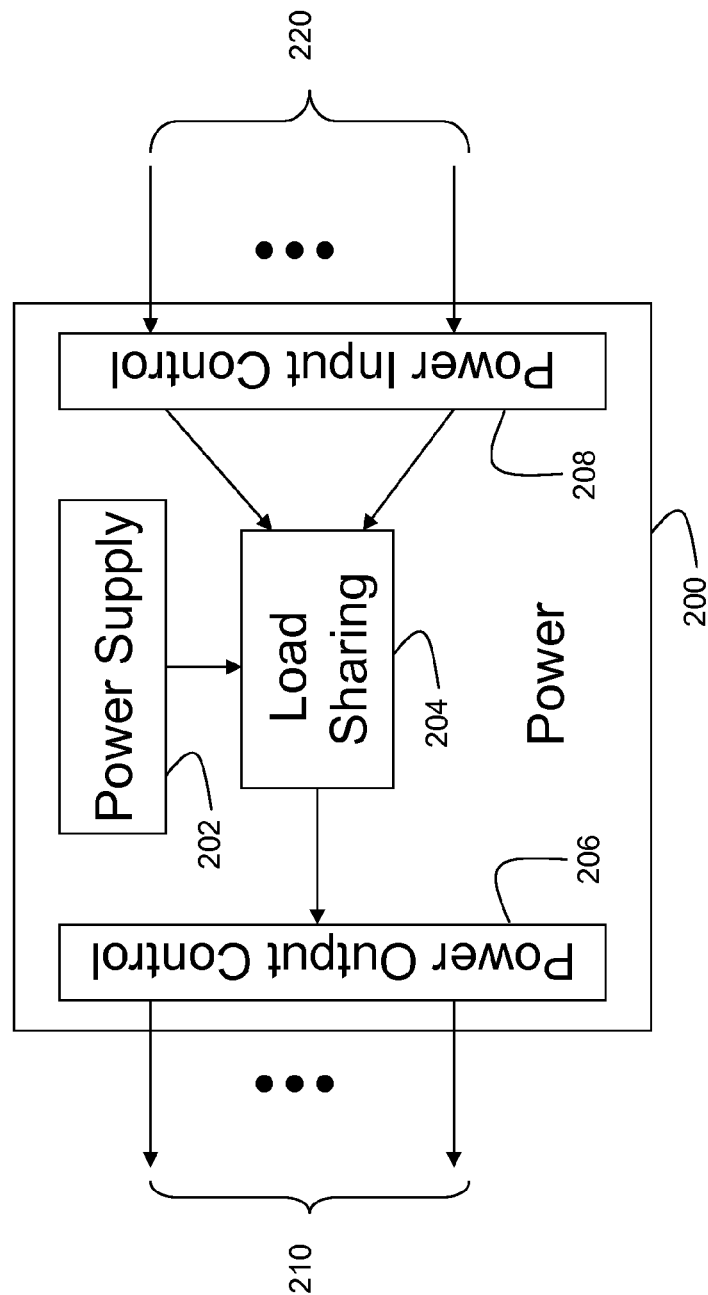
FIG. 2 is a block diagram of a power stackable device according to one embodiment of the present invention.

Referring to FIG. 2, a power supply stackable device 200 is shown with power inputs 220 providing power to the power input control logic 208 that controls which port issues a power request via the power inputs and controls the power supplied to the load sharing logic 204. An integral power supply 202 also supplies power to the load sharing logic 204. The load sharing logic 204 supplies power to power output control logic 206. The power output control logic 206 controls which power outputs 210 supply power to switches, other stackable power devices, or other end nodes.

Figure 3:
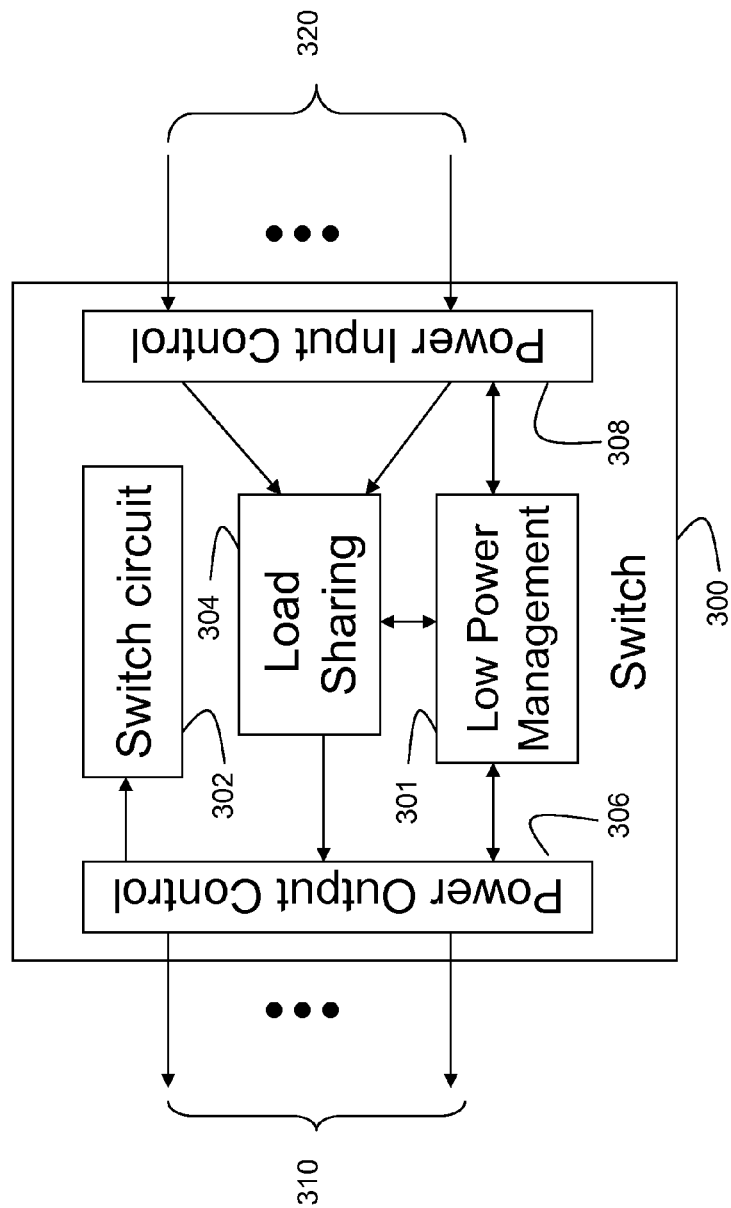
FIG. 3 is a block diagram of a switch with power sharing for consumption and for output, but no integral power supply, according to one embodiment of the present invention.

Referring to FIG. 3, a stackable switch device 300 that is capable of power sharing, for consumption and for output, but contains no integral power supply of its own, is shown. Power inputs 320 provide power to the power input control logic 308 that controls which inputs supply power to the load sharing logic 304. The load sharing logic 304 supplies power to power output control logic 306. The power output control logic 306 controls which power outputs 310 supply power to switches or other stackable power devices via power outputs 310 and power to the Switch circuitry 302. Since this device does not have an integral power supply, it has Low Power Management circuitry 301 that provides the ability to send and receive messages to communicate with other directly or indirectly connected devices, before operation levels of power are allocated to this device. The Low Power Management circuitry 301 may contain a battery, solar cell, or other type of low power source to power the circuitry that communicates with other devices and makes power usage decisions.

Figure 4:
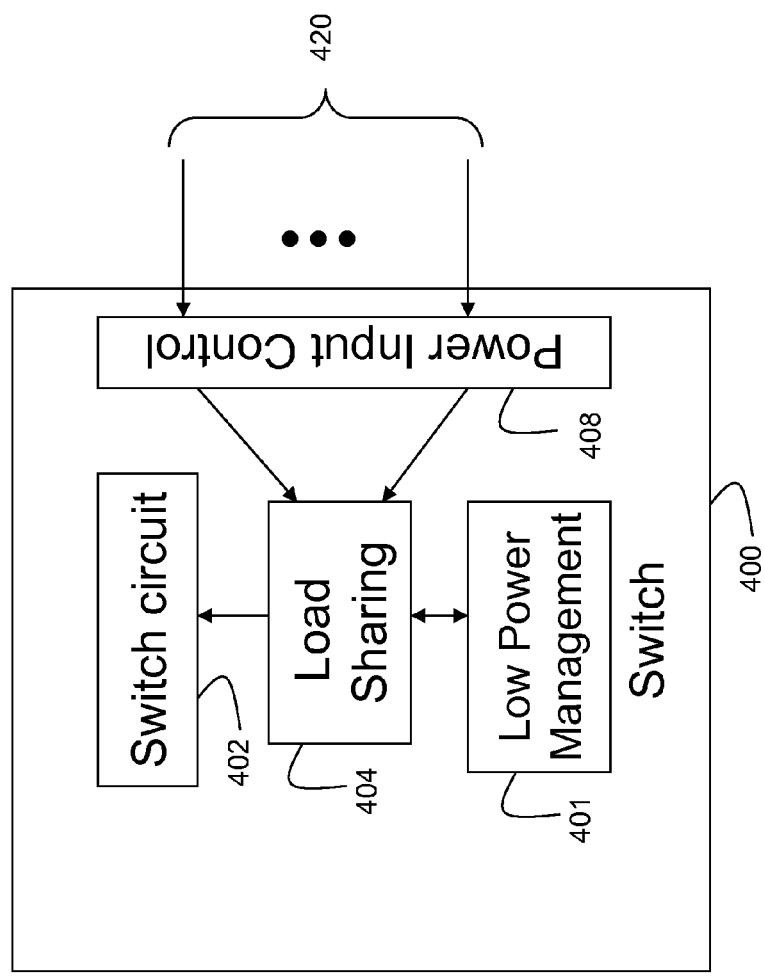
FIG. 4 is a block diagram of a switch with power sharing for consumption only, but no integral power supply, according to one embodiment of the present invention.

Referring to FIG. 4, a stackable switch device 400 is shown that is similar device 300 but without the power output capability, so the Switch circuitry 402 receives power from the load sharing logic 404.

Figure 5:
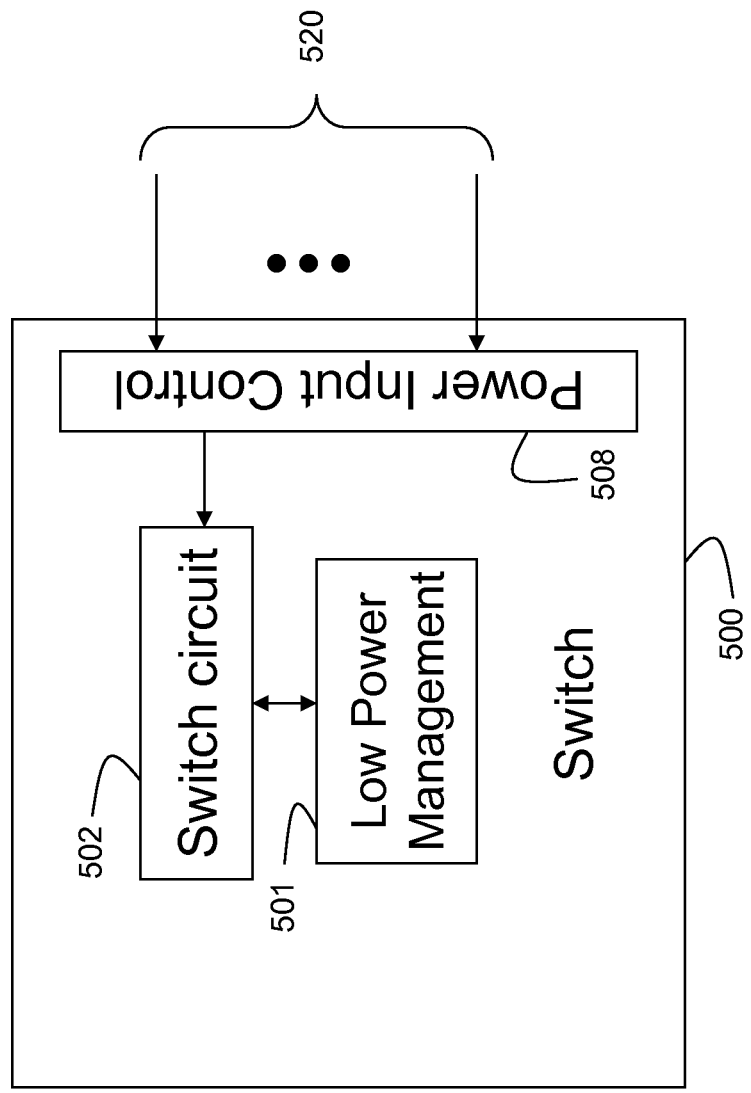
FIG. 5 is a block diagram of a switch with the ability to receive power from only a single external power source according to one embodiment of the present invention.

Referring to FIG. 5, a stackable switch device 500 is shown with the ability of receiving power from only a single external power source via the power input control logic 508 and power input cables 520 to provide power to the switch circuitry 502.

Figure 6:
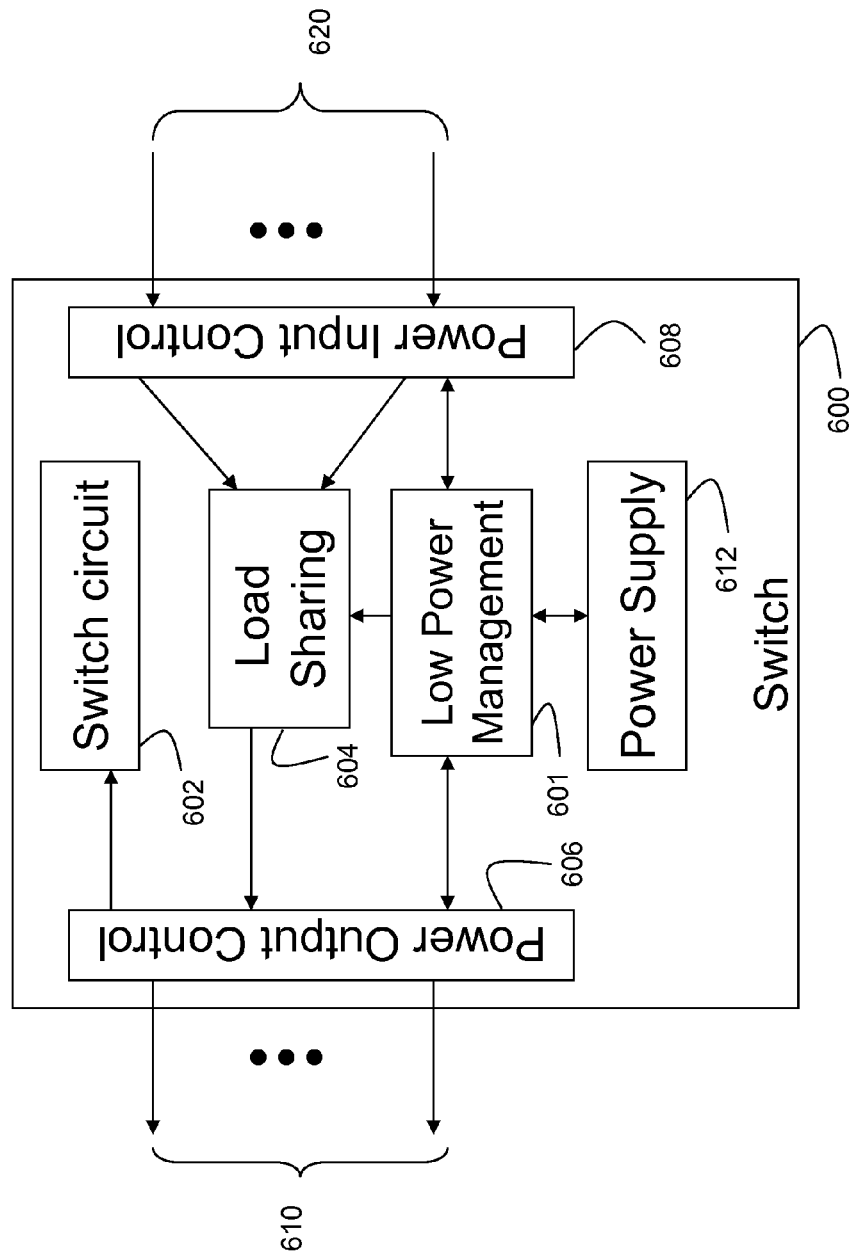
FIG. 6 is a block diagram of a switch with power sharing for consumption and for output, with an integral power supply, according to one embodiment of the present invention.

Referring to FIG. 6, a stackable switch device 600 is shown that is similar to device 300, but with the addition of an integral power supply 612 that supplies power to the load sharing logic 604, via the Low Power Management module 601. As with stackable switch device 300, stackable switch device 600 is capable of power sharing, for consumption and for power output to other devices. Power inputs 620 provide power to the power input control logic 608 that controls which inputs supply power to the load sharing logic 604. The load sharing logic 604 supplies power to power output control logic 606. The power output control logic 606 controls which power outputs 610 supply power to switch circuit 602 or other stackable power devices via power outputs 610 and power to the Switch circuitry 602. The Low Power Management module 601 is used in the event of a failure of integral power supply 612 to request power from connected devices.

Now that system interconnection and system building blocks have been disclosed, the logic for controlling these components to provide a cost effective, highly available, flexible, and optionally auto-configuring a power sharing stackable switch system, will be disclosed. There are two general ways to solve the power management in a system comprising multiple separately installable devices: (1) using a central master to control the power allocation for all the devices in the stack, or (2) using a distributed algorithm in which each device uses power allocation decision logic to come up with a mutually agreed-upon power allocation.

In one embodiment of the present invention, a "central master" method is used to allocate power among a plurality of network-connected devices, which may include network switches and other devices. The devices may be stackable. Referring to FIGS. 8a-8d, a flowchart is shown of a method for performing such power allocation according to one embodiment of the present invention.

Figure 8A:
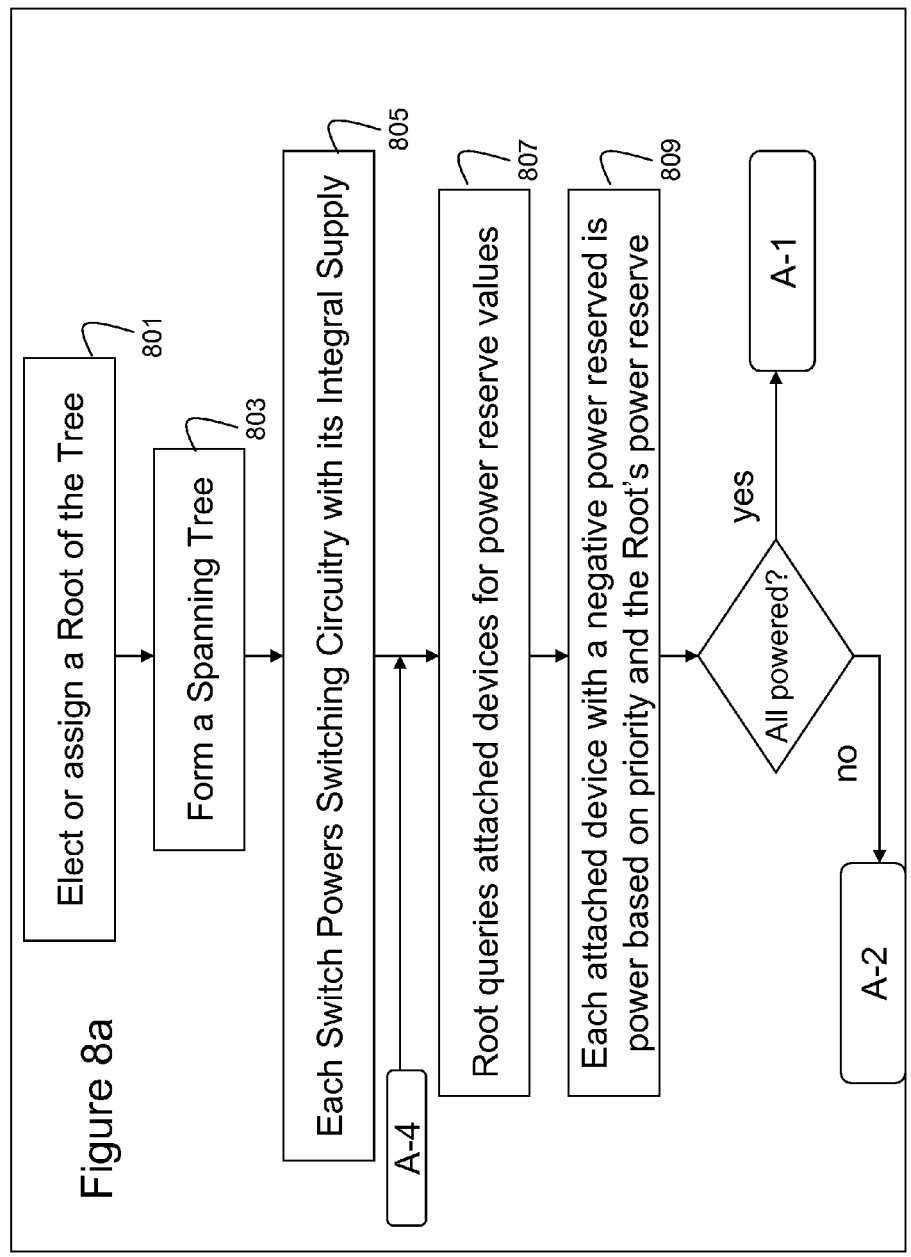
FIGS. 8a, 8b, 8c, and 8d illustrate a "central master" method of power allocation according to one embodiment of the present invention.

One of the devices is selected as a master device in step 801 in FIG. 8a. The master device may be selected in any of a variety of ways. For example, the master device may be assigned a priori, or an election algorithm may be used to select the device with the highest priority ID or using another tie breaking scheme, to which all the stackable devices agree. The devices may exchange the device ID in accordance with a power tree protocol in any of a variety of ways, such as by using Ethernet packets sent (by wire or wirelessly) or by using some other communication method over dedicated power cables. These messages may be sent periodically to assure the devices that the master is alive and doing well and provide additional status information. The messages may also be used to communicate information about each device in accordance with the power tree protocol, so that once a master is selected the master and the other devices will have the information needed to manage the system power configuration and allocation.

The elected master obtains the power policy information in any of a variety of ways using the power tree protocol, such as from data stored locally within the master device, gathered from the other stackable devices, found on a policy server, or any combination of these. The power capabilities of each of the devices in the stack may already have been gathered in the election messages, or be gathered using dedicated query messages sent to each of the devices in the stack. At this point the master has obtained capability information about each device in the stack, such as power output capability, power input capability, power supply capability, and switch power requirements. A stack topology is calculated using information about which devices are connected to each other by power links.

The device power output and input capabilities include the power that can be delivered via the links that connect the devices. For example, an Ethernet link that supports the IEEE 802.3ad standard is able to deliver less power than an Ethernet link that supports the IEEE 802.3at standard. Knowing the capability of the link of the devices and the stack topology, the power delivery capability of each link is determined by comparing the device link power input or output capabilities at each end of the link and finding compatible operating modes. The highest power delivery capability, of a compatible mode, is the power delivery capability of that link in the power tree. If all of the links of the devices in the stack have the same power delivery capability, then the operational compatibility complexity can be removed from the power allocation logic. In this case, the link power delivery capability can be treated as a constant.

A power tree is calculated using, for example, any one of a variety of known centralized power tree calculations, spanning outward from the elected master (such as Prim's spanning tree algorithm) in step 803 in FIG. 8*a*. The master device is at the root of the resulting power tree.

Once the tree is constructed, the method fans outward in the power tree, starting at the root. At each device in the tree, the method allocates only the power provided by each integral power supply on that device to the switching circuitry of that device (step 805). Since not all devices will have an integral power supply sufficient to power its switch circuitry, some devices will have a negative power reserve after step 805 is complete.

If any devices have a negative power reserve, then, starting at the root, power requirements of devices connected to the root are queried (step 807). The root performs a power allocation to a queried device via a path if the root has sufficient extra power available and a path has sufficient power delivery capabilities to meet the requested allocations. This power allocation includes both making a power delivery and power input capability determination and delivering the power (step 809). If the root has insufficient power, then a negative power reserve value associated with that device is stored for later use, equal to the amount of power still needed by that device. Otherwise, all the power requested was provided to that device, so the power reserve value of that device will be positive (or at least non-negative).

Figure 7A:
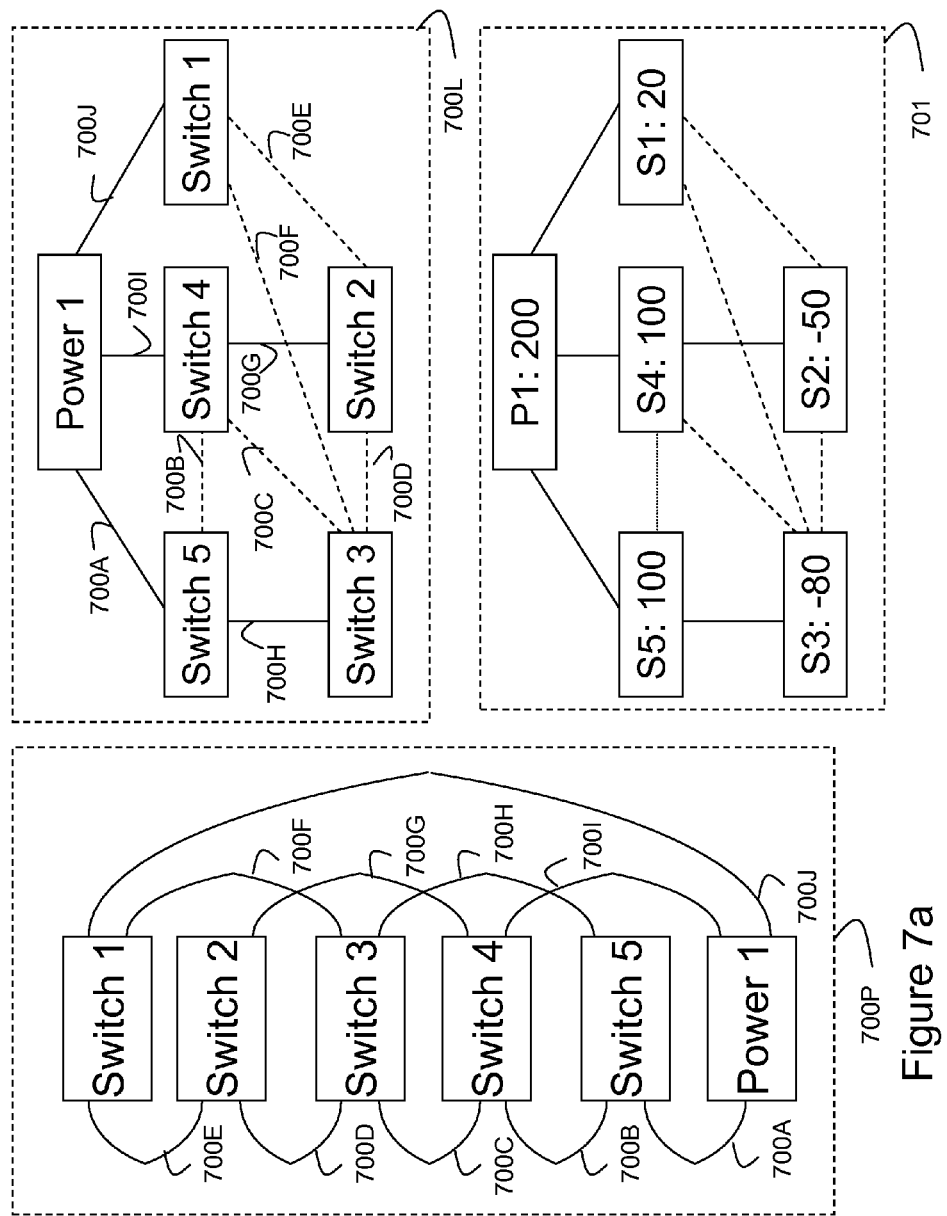
FIG. 7a illustrates physical power connections among interconnected devices, and a corresponding power tree according to one embodiment of the present invention.

Referring to the left-hand side of FIG. 7*a*, the physical connections among a set of stackable devices 700P, consisting of 5 switch modules and one power module, are illustrated. The particular set of devices within set 700P is merely an example and does not constitute a limitation of the present invention. The solid curved lines between the modules represent cable connections 700A-700J, for example Ethernet cables. The resultant logical power tree 700L is illustrated on the right, containing the same set of stackable modules and interconnecting cables 700A-700J. The Power 1 module is the root of the logical power tree 700L. The solid lines between the modules (700A, 700H, 700I, 700G, 700J) represent primary links in the power tree 700L. The dashed lines between the modules (700B, 700C, 700D, 700G, 700E, 700F) represent backup links in the power tree 700L. Any technique may be used to designate certain links as "primary" links and other links as "backup" links in the power tree 700L. Furthermore, the use of backup links is optional. Instead, for example, all links may be designated as primary links.

Each direct connection between a pair of directly-connected devices in the set 700P, or between a pair of directly-connected nodes in the power tree 700L, is referred to herein as a "link." In the example shown in FIG. 7*a*, each of the physical cable connections 700A-J represents a single link, in both the device set 700P and in the power tree 700L. A "path" between two devices/nodes may include a series of one or more links connecting the two nodes. For example, in power tree 700L, nodes "Power 1" and "Switch 3" are connected by a path consisting of link 700A followed by link 700H. As another example, the switches "Switch 2" and "Switch 1" are connected by a path consisting of link 700E. As another example, the switches "Switch 2" and "Switch 1" are connected by a path consisting of link 700E. A "path" between two devices/nodes may also include a set of one or more links in parallel connecting the two nodes.

In the example of FIG. 7*a*, the stackable devices have the following power supply capability and power need; Power 1 module can supply 200 watts and has no power need; Switch 1 module can supply 100 watts and has a 80 watt power need; Switch 2 module has no supply capability and has a 50 watt power need; Switch 3 module has no supply capability and has a 80 watt power need; Switch 4 module can supply 200 watts and has a 100 watt power need; Switch 5 module can supply 200 watts and has a 100 watt power need.

After the initial pass through the power allocation method of FIG. 8*a* we find the state of each stackable module illustrated as group 701 in FIG. 7*a*. The Power 1 module has a power reserve value of 200 watts; Switch 1 module has a power reserve value of 20 watts; Switch 2 module has a power reserve value of −50 watts; Switch 3 module has a power reserve value of −80 watts; Switch 4 module has a power reserve value of 100 watts; and Switch 5 module has a power reserve value of 100 watts. Since all the devices connected directly to the root (Switches 1, 4, and 5) have positive power reserves, the root (Power 1 module) does not allocate any power at this step.

Figure 8B:
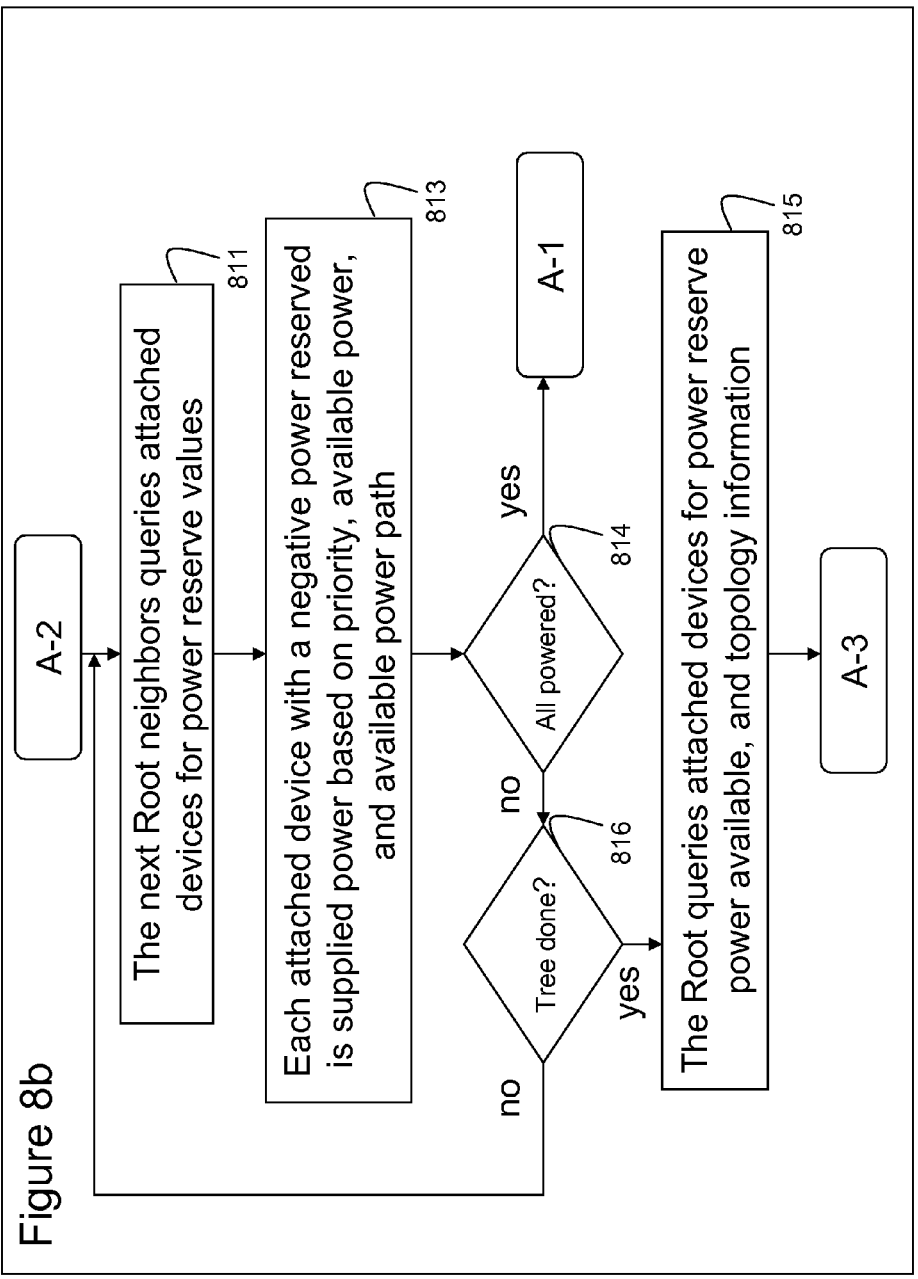

Next, the root neighbors are instructed to query the power requirements for devices connected to them (FIG. 8*b*, step 811). To determine if one module can supply the requested power to another module, it must have the power to supply and it must have a path that can deliver the requested power. If these criteria are met, then power is supplied on a per port priority basis (step 813).

Figure 7B:
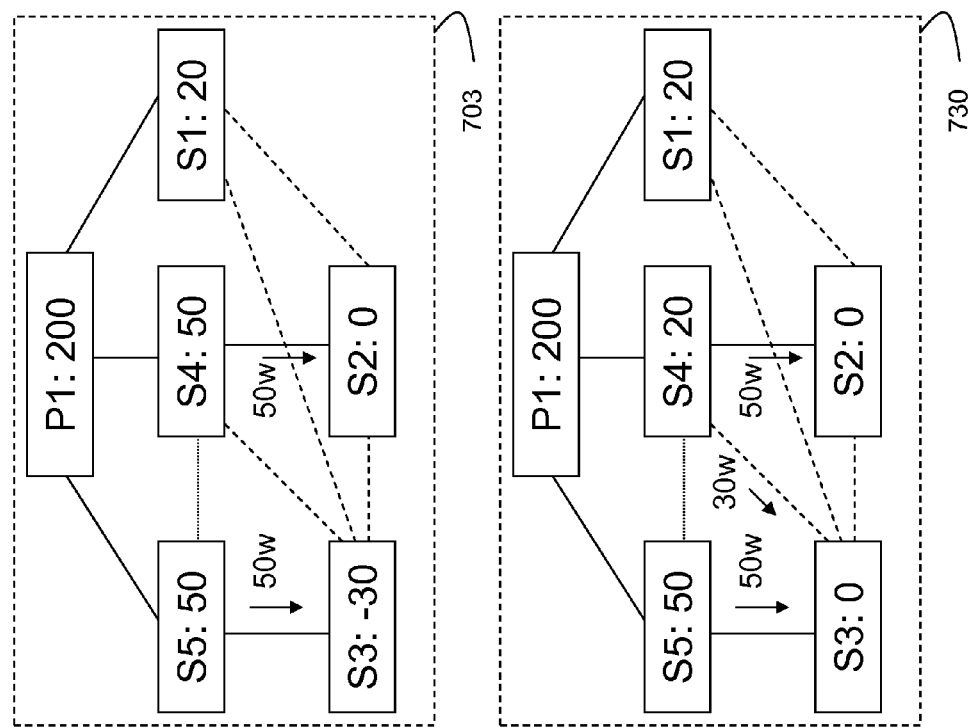
FIG. 7b illustrates an allocation of power among the devices of FIG. 7a according to one embodiment of the present invention.

Referring to FIG. 7B, root neighbor Switch 4 queries Switch 2 for its power reserve and receives a −50 watts power reserve from Switch 2. Switch 4 has a power reserve of 100 watts and the link between Switch 4 and Switch 2 is capable of carrying 50 watts (802.3at capable link for example), so the requested 50 watts is provided by Switch 4 to Switch 2 over the cable connecting the two modules. Meanwhile root neighbor Switch 5 queries Switch 3 for its power reserve and receives a −80 watts power reserve from Switch 3. Switch 5 has a power reserve of 100 watts and the link between Switch 5 and Switch 3 is only capable of carrying 50 watts, so only 50 of the requested 80 watts is provided by Switch 5 to Switch 3 over the cable connecting the two modules, leaving a power reserve of −30 watts at Switch 3.

Figure 8C:
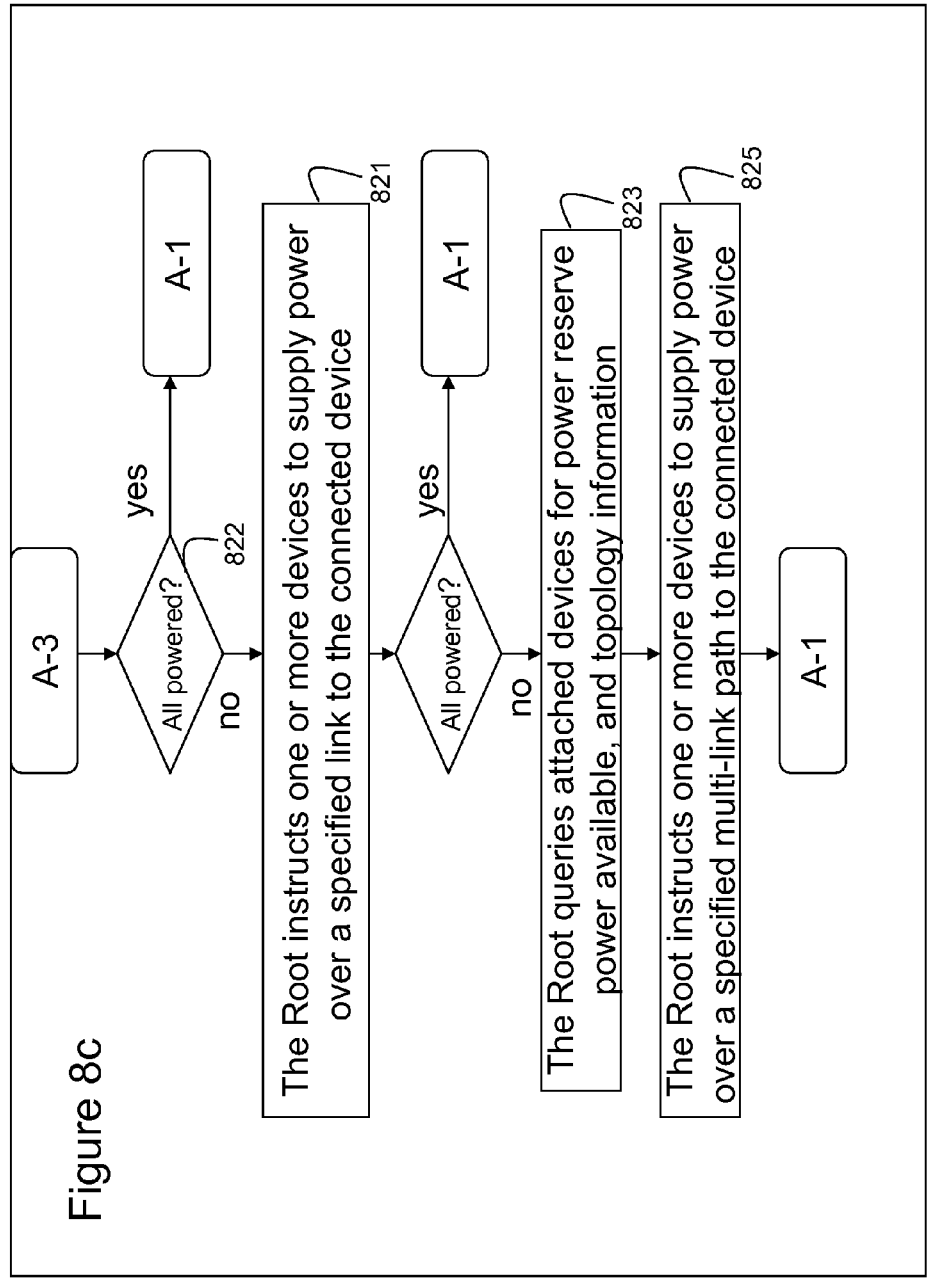

If all the requested power could not be met from the resident power supplies directly to their neighbors using the links in the power tree (step 814), then the master queries devices to learn the unmet power needs of the devices in the power tree, the unused available power in the power tree, and the power tree topology (step 815). The power tree topology information includes the links between the stackable modules, the power capability of each link, and the status of each link, which includes if the link is a primary link in the power tree or a backup link and the power granted at present on each link. The master looks for other paths between modules with available power and modules with a negative power reserve that are in the direction of the root (previous allocations were done away from the root) or using backup links of the power tree. If backup links are chosen, then the existing power allocations must be traced to avoid an endless loop of power allocation. If the master can find links between modules that can supply the power needed by another module directly connected, then the master instructs the module to supply power over a specified link to the connected device (FIG. 8*c*, step 821).

Note that the power of multiple devices connected in series along a path consisting of multiple links may be added together to provide the sum of the power provided by the multiple devices individually. For example, if a device that is capable of providing 60 W of power is connected by a link to a device that is capable of providing 40 W of power, these two devices may be treated as a single 100 W node in the power tree.

If all the requested power requirements have been met after this iterative process of applying power in waves starting at the root, extending out one hop each iteration along the power tree, then using either backup links in the power tree or granting power toward the root of the power tree, then we are in a "direct" power allocation topology. Otherwise, the power requirements cannot be met by direct neighbors in the power tree, in which case the root again queries the devices to verify the present power allocation and needs (step 823). Using this information, one or more power paths are calculated in an attempt to meet power requirements by supplying power from one device through one or more other devices to power a device that is not adjacent to the powering device (step 825).

Figure 7C:
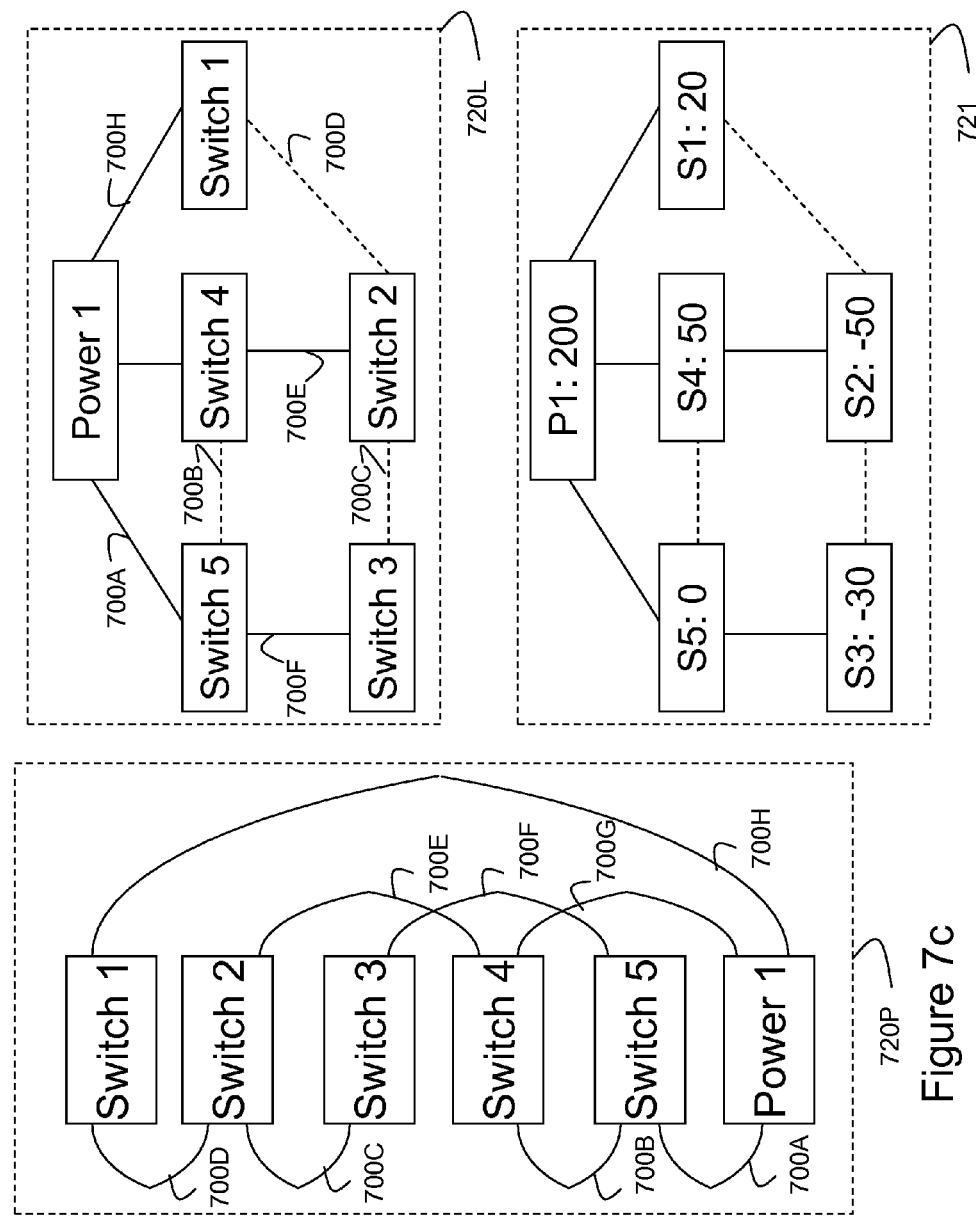
FIG. 7c illustrates physical power connections among interconnected devices, and a corresponding power tree according to a second embodiment of the present invention.

For example, consider the alternate configuration shown in FIG. 7c, in which the power supply capability and power need are as shown in element 721: Power 1 module can supply 200 watts and has no power need; Switch 1 module can supply 100 watts and has a 80 watt power need; Switch 2 module has no supply capability and has a 50 watt power need; Switch 3 module has no supply capability and has only a 50 watt power need instead of the 80 watt need in the previous example; Switch 4 module can supply 200 watts and has a 150 watt power need; Switch 5 module can supply 100 watts and has a 100 watt power need.

Figure 7D:
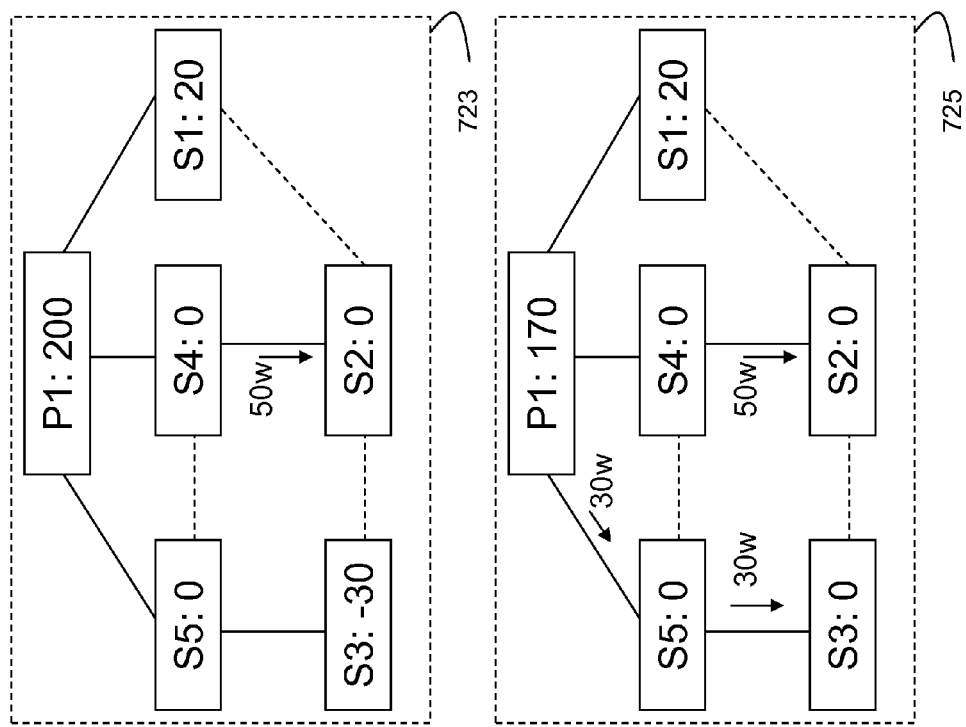
FIG. 7d illustrates an allocation of power among the devices of FIG. 7c according to the second embodiment of the present invention.

After allocating power by direct neighbors using the same power allocation algorithms described above, switch 3 still has an unmet power need of 30 watts, as shown by element 723 in FIG. 7d. As a result, the master determines a power path from power device 1 to switch 3 via switch 5. Power 1 delivers 30 watts to switch 5 and switch 5 in turn passes that power switch 3 as shown in element 725 of FIG. 7d.

Figure 8D:
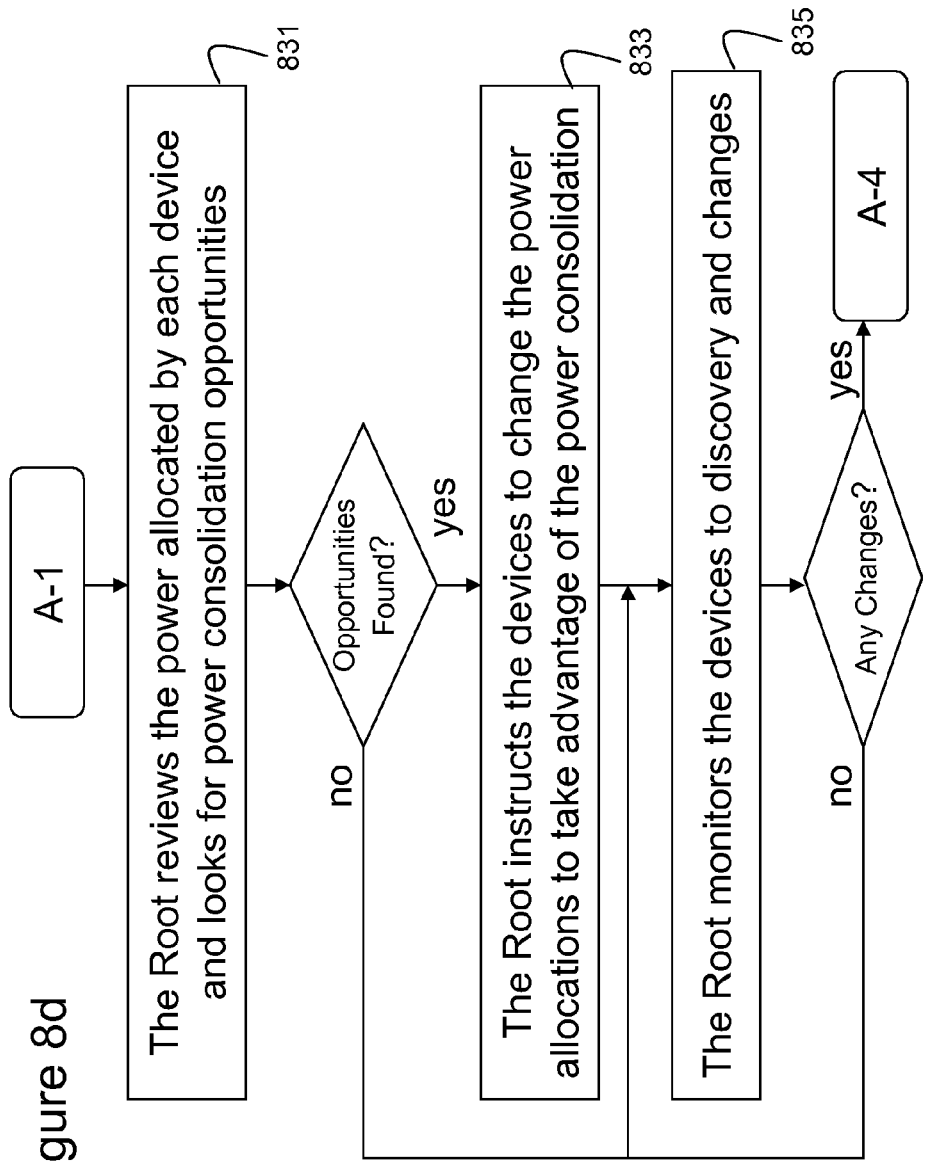

Referring to FIG. 8d, the root reviews the power allocated in an effort to consolidate the power allocations to lower energy consumption (831). If one power supply can supply the power that two or more power supplies are presently providing, then the root instructs devices to change the power allocations to the new, more consolidated allocation (833). In this case, the original power allocations are provisional power allocations which are superseded by the consolidated allocation. The root can either instruct the devices with power supplies that are not allocating power to shut them down to conserve energy or the devices can have their own policy that instructs the device to power down any power supply not being utilized. The root monitors any changes in configuration, power need, and operation state of the devices and their ports to look for changes (835). If there are changes found the allocation process is revisited.

Figure 9A:
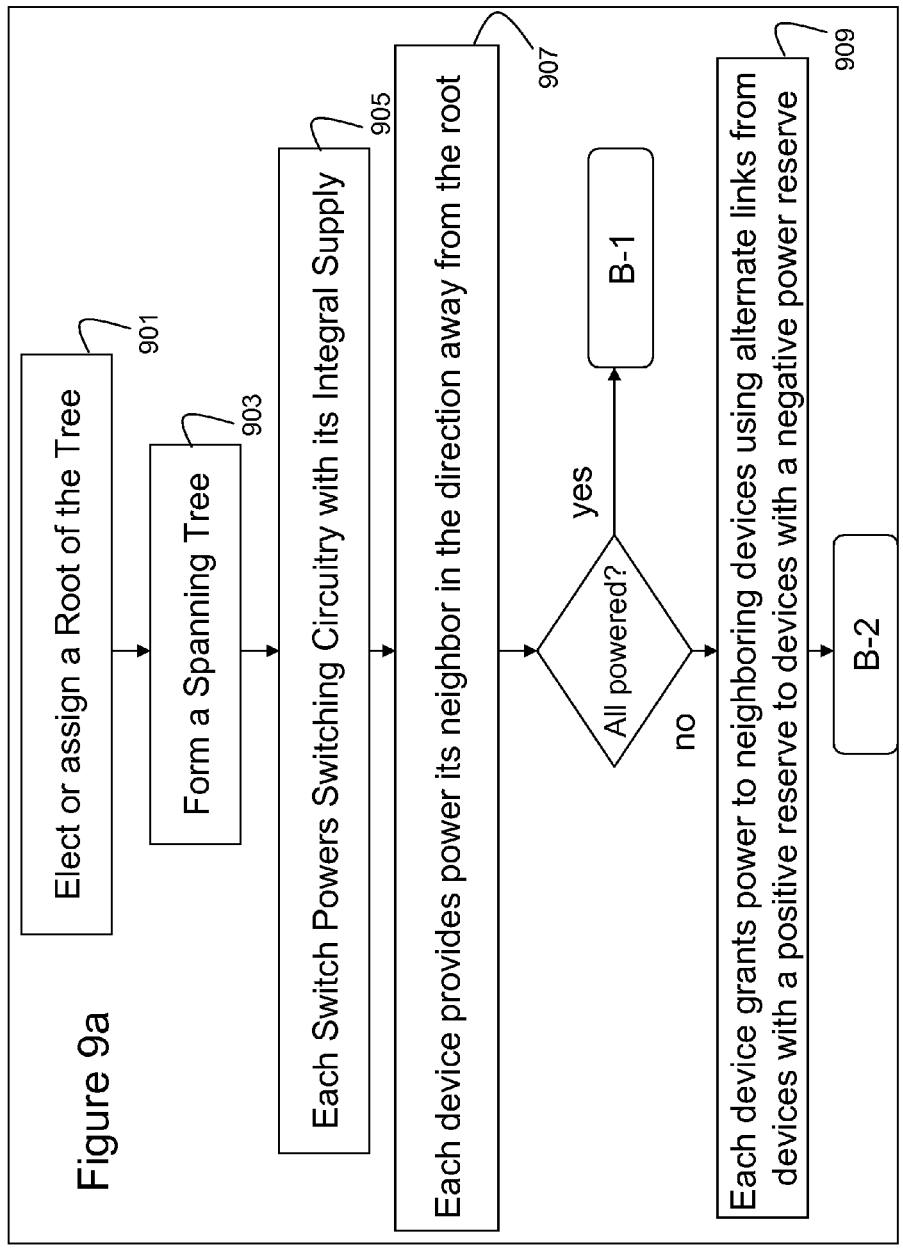
FIGS. 9a & 9b illustrate a distributed method of power allocation according to one embodiment of the present invention.
Figure 9B:
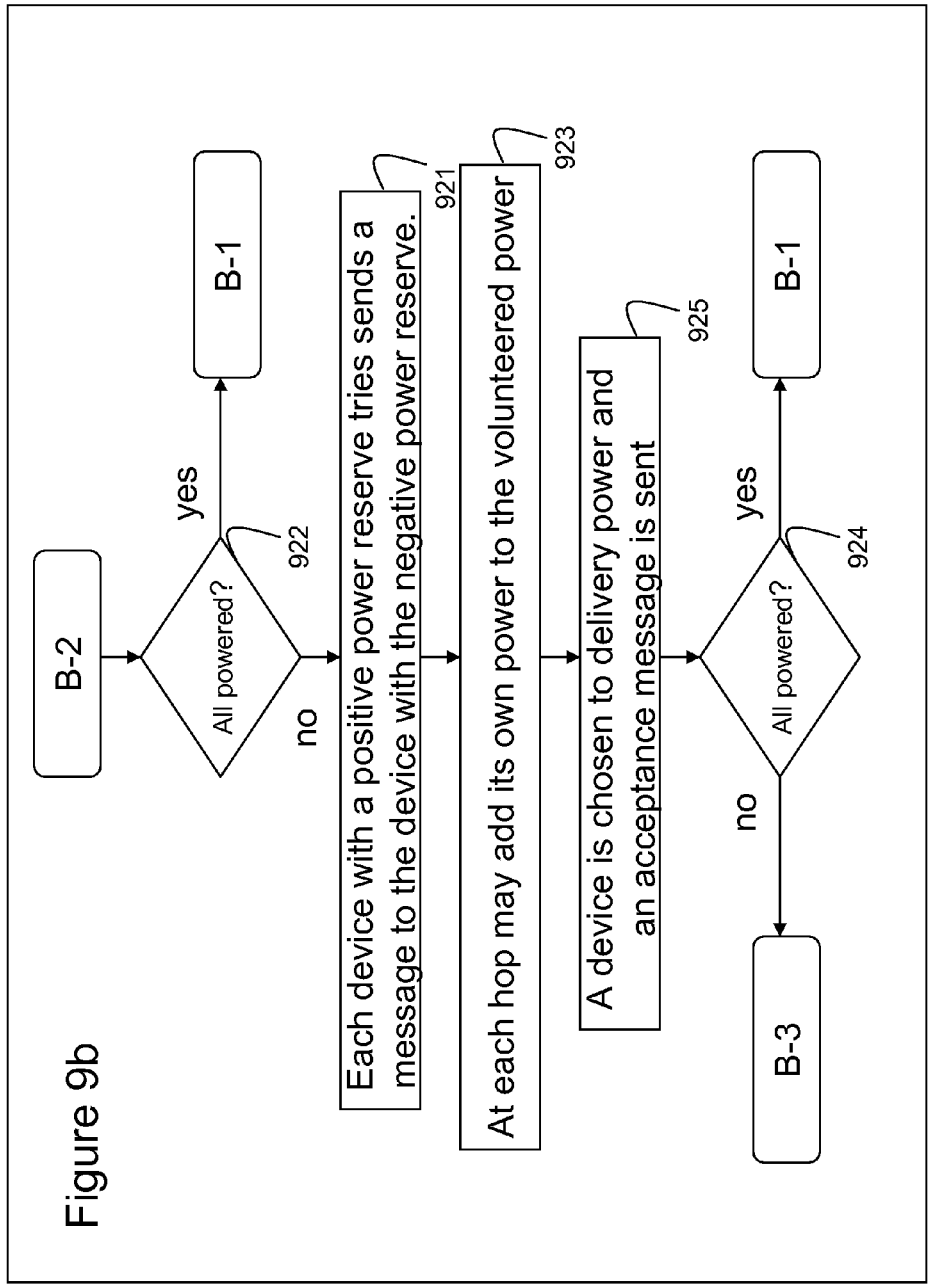

In another embodiment of the present invention, a distributed method is used to allocate power among a plurality of network-connected devices, such as network switches and other devices. The devices may be stackable. Referring to FIGS. 9a-9b, a flowchart is shown of a method for performing such power allocation according to one embodiment of the present invention.

The distributed scheme also involves selecting a master for the stackable devices (step 901 in FIG. 9a). The master may, for example, be selected in accordance with the power tree protocol in any of the ways described above with respect to the central master method of FIGS. 8a-8c. For example, a power tree may be overlaid on the results of an IEEE spanning tree or a rapid spanning tree. If power only modules participate in the power tree topology, then a separate power tree should be created.

Each device in the power tree obtains the power policy information in accordance with the power tree protocol in any of a variety of ways, such as from data stored locally within the devices in the power tree, data gathered from other stackable devices, data found on a policy server, or any combination of these. The power capabilities of each of the neighboring devices in the stack may already have been gathered in the election messages, or be gathered using dedicated query messages sent to each of the neighboring devices. Capability information such as power output capability, power input capability, power supply capability, and switch power requirements, about each neighboring device are known at this point. A stack topology is calculated using information about which devices are connected to each other by power links.

The plurality of devices create a power tree using, for example any one of a variety of known distributed spanning tree calculations (such as the IEEE 802.1D Spanning Tree Protocol or IEEE 802.1w Rapid Spanning Tree Protocol) (step 903 in FIG. 9A).

Once the tree is constructed, the method begins with each device only allocating power from the device's integral power supply (if any) to the switching circuitry of that device (step 905 in FIG. 9A). Since not all devices will have an integral power supply sufficient to power its switch circuitry, some devices will have a negative power reserve. Each device provides power its neighbor in the direction away from the root of the power tree (step 907).

If there is insufficient power, then a negative power reserve value associated with that device is stored for later use. Otherwise, all the power requested was provided, so the power reserve value will be positive (or at least non-negative). In the case of a negative power reserve still remaining, each device grants power to neighboring devices using links in the power tree towards the direction of the root, using backup links in the power tree, or aggregated links from devices with a positive power reserve to neighboring devices with negative power reserve (step 909).

If there still are devices with a negative power reserve after the completion of step 909, then an attempt is made to find a power path from one device through one or more other devices to power a device that is not adjacent (linked) to the powering device. Each device with a positive power reserve tries to volunteer its assistance by sending a message to the device with the negative power reserve (step 921). At each hop from the device volunteering the power to the device with a power need, the device receiving the volunteer message may incorporate its own power in addition to the power from the other device to result in a volunteered power amount that incorporates the upstream volunteered power with its own power (step 923). This allows a power request to be met though no one device has the requested amount of power.

The device with the power need may receive one or more power volunteer messages. A device to deliver the power is chosen from the set of received volunteers and an accept message is sent in the direction of the chosen volunteer (step 925). As the message travels from the power needing device to the one or more volunteer devices, that may have added their power to create the full power volunteered, each volunteering device subtracts the amount it has volunteered and passes the remainder in the "power accepted" field specified in the accept message. Once the original volunteer receives the accept message, power can start to be delivered to the device with the negative power reserve. Power is delivered link by link and the power is forwarded through, or possibly added to, by one or more intermediate devices.

Referring to the left-hand side of FIG. 7c, the physical connections among a set of stackable devices 700P, including 5 switch modules and one power module, is illustrated. The solid curved lines between the modules represent cable connections, such as Ethernet cables. The resultant logical power tree 720L is illustrated on the right, containing the same set of stackable modules. The Power 1 module is the root of the logical power tree 720L. The solid lines between the modules represent links in the power tree 720L. The dashed lines between the modules represent backup links in the power tree.

The stackable devices have the following power supply capability and power need; Power 1 module can supply 200 watts and has no power need; Switch 1 module can supply 100 watts and has a 80 watt power need; Switch 2 module has no supply capability and has a 50 watt power need; Switch 3 module has no supply capability and has a 80 watt power need; Switch 4 module can supply 200 watts and has a 100 watt power need; Switch 5 module can supply 200 watts and has a 100 watt power need. After the initial pass through the power allocation method we find the state of each stackable module illustrated as group 721. The Power 1 module has a power reserve value of 200 watts; Switch 1 module has a power reserve value of 20 watts; Switch 2 module has a power reserve value of −50 watts; Switch 3 module has a power reserve value of −80 watts; Switch 4 module has a power reserve value of 100 watts; and Switch 5 module has a power reserve value of 100 watts. Since all the devices connected directly to the root (Switches 1, 4, and 5) have positive power reserves, the root does not allocate any power at this step.

Next, the root neighbors are instructed to query the power requirements of devices connected to them (step 811 in FIG. 8b). To determine if one module can supply the requested power to another module, it must have the power to supply and it must have a path that can deliver the requested power. If these criteria are met, power is supplied on a per port priority basis (step 813).

Note that in this and other methods disclosed herein, power may be lost as it is passed from one device to another. As a result, a SOW input to one device may result in an output of less than SOW from the same device. Such losses may be compensated for in any of a variety of ways. For example, the power allocation algorithm may take into account such power loss when allocating power.

Figure 10A:
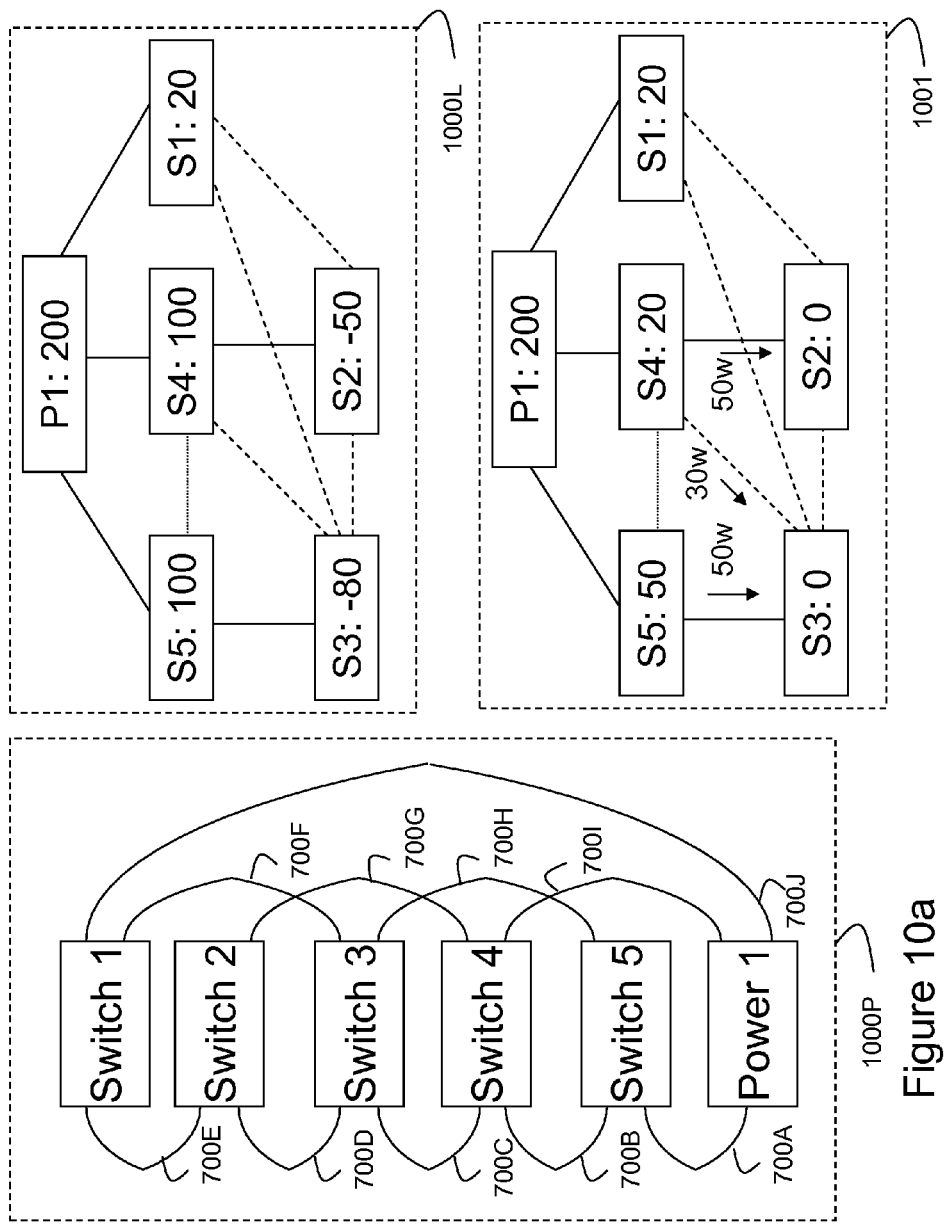
FIG. 10a illustrates physical power connections among interconnected devices, and a corresponding power tree according to a third embodiment of the present invention.
Figure 10B:
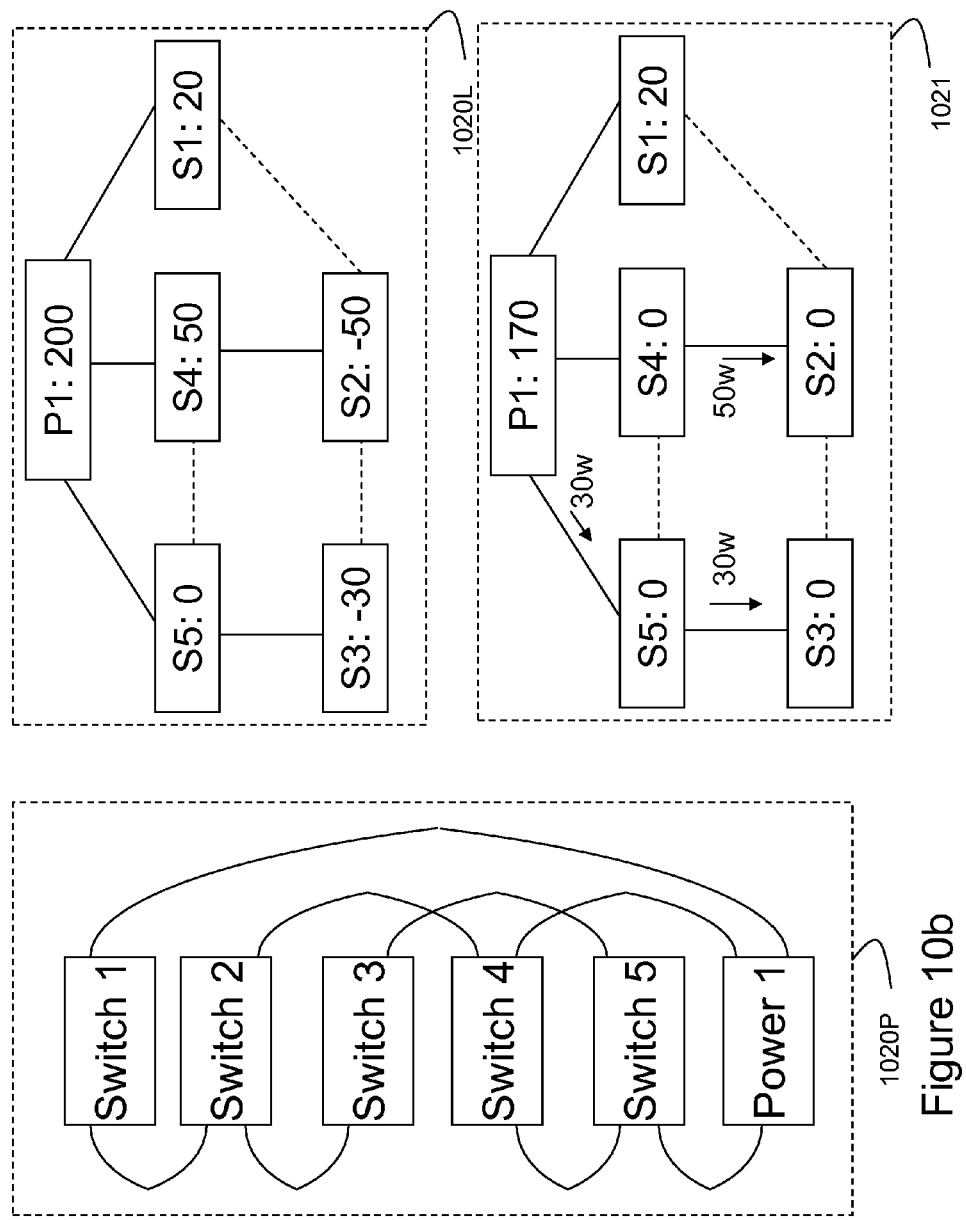
FIG. 10b illustrates an allocation of power among the devices of FIG. 10a according to a fourth embodiment of the present invention.

Referring to FIG. 10a, the configuration 1000P and end results 1001 using the distributed method are the same for the centralized example, as shown in element 700P of FIG. 7a and element 721 of FIG. 7b. Likewise referring to FIG. 10b, the configuration 1020P and end results 1021 using the distributed method are the same for the centralized example, as shown in element 720p of FIG. 7c 720p and element 721 of FIG. 7d.

Devices that do not have an integral power supply may have a low power operational mode that provides some message sending and receiving capabilities to communicate the power requirements and to form the power tree topology.

One advantage of embodiments of the present invention is that they enable power to be provided to network devices on an as-needed basis. In other words, power is provided to each device based on the current power needs of that device. This stands in contrast to conventional systems, in which each device contain its own large internal power supply, which is sized to handle the maximum power requirements of the device. Such a conventional approach is inefficient because it results in large amounts of available power being unutilized most of the time. In contrast, embodiments of the present invention allow each device to include a relatively small internal power supply, or even not to include any internal power supply, so long as sufficient power can be provided over the network to each device, from other devices, when the need arises. As a result, networks implemented according to embodiments of the present invention may contain smaller devices with smaller power supplies than conventional networks, without sacrificing power provision capability.

Embodiments of the present invention may also produce aggregate power savings. For example, embodiments of the present invention may effectively consolidate a large number of power supplies into a smaller number of power supplies by providing a set of devices needing power with all of the power they need using a smaller number of larger power allocations, rather than with a larger number of smaller power allocations. As a result, one or more power supplies which previously had provided power to the network devices may be turned completely off. Such power consolidation may produce increased efficiency and power savings even when such consolidation provides the same aggregate amount of power to the network devices as the larger number of power supplies.

Embodiments of the present invention also provide power supply redundancy by enabling a network device, such as a switch, to receive power from multiple alternative power sources in the network. Such redundancy results in higher power availability and better network availability, because if one power supply in the network fails, the devices which had been receiving power from that power supply can receive power from other power supplies in the network instead. In contrast, in conventional systems in which each device receives power from an internal power supply or from a fixed external power supply, if such a power supply becomes unavailable, the device will lose power possible disrupting the network availability, even if power reserves exist elsewhere in the network.

Another advantage of embodiments of the present invention is that they may be used more easily than conventional techniques for providing power. In a conventional system, if a particular device requires more power, typically the device must be manually connected to a larger internal or external power supply. Such a task of manual configuration can be tedious, slow, inaccurate, and inefficient, particularly as the number of devices needing power grows. In contrast, embodiments of the present invention dynamically, quickly, and automatically reconfigure power within the network to satisfy the changing power needs of network devices, without the need for manual intervention.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The techniques described above may be implemented, for example, in hardware, firmware, software, or any combination thereof. The techniques described above may be implemented in one or more computer programs executing on a programmable computer including a processor, a storage medium readable by the processor (including, for example, volatile and nonvolatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    selecting a first device from a plurality of interconnected devices to form a root of a power tree connecting the interconnected devices;
    allocating power among neighbors of the interconnected devices for power to be provided in a direction along the tree away from the root;
    determining whether at least one of the interconnected devices needs more power allocation after the allocation of power among the neighbors; and
    selectively further allocating power among the neighbors for power to be provided in a direction along the tree toward the root, based on the determination.

2. The method of claim 1, wherein
    after the allocation of power among the neighbors for power to be provided in the direction along the tree away from the root, at least one of the interconnected devices has an insufficient power allocation and at least one of the interconnected devices has an excess power allocation, and
    the act of selectively further allocating power comprises granting power from said at least one of the interconnected devices having the excess power allocation to said at least one of the interconnected devices having the insufficient power allocation.

3. The method of claim 1, further comprising:
    selectively allocating power among non-neighbors of the interconnected devices based on a determination of whether at least one of the interconnected devices needs more power allocation after the further allocation of power.

4. The method of claim 3, wherein the act of selectively allocating power among the non-neighbors comprises:
    allocating power volunteered by at least one of the interconnected devices that has an excess power allocation after the further allocation of power.

5. The method of claim 4, further comprising:
    communicating a volunteer message from each device of said at least one of the interconnected devices that has the excess power allocation after the further allocation of power;
    selecting one of the interconnected devices that communicate the volunteer messages; and
    communicating an accept message to the selected interconnected device.

6. The method of claim 5, further comprising:
    for at least one of the interconnected devices that has the excess power allocation after the further allocation of power, modifying a field in the accept message to reflect a power volunteered by the interconnected device.

7. The method of claim 1, wherein the selecting comprises selecting a network switch from a plurality of interconnected network switches.

8. The method of claim 1, further comprising arranging the interconnected switches in a stack.

9. The method of claim 1, further comprising using a spanning tree protocol to form the power tree.

* * * * *